United States Patent [19]

Swick et al.

[11] 3,810,279
[45] May 14, 1974

[54] PLASTIC DRIVE FASTENER

[75] Inventors: Edwin Grant Swick, Des Plaines; John Frederick Nelson, Bartlett, both of Ill.

[73] Assignee: Illinois Tool Works Inc., Chicago, Ill.

[22] Filed: Feb. 28, 1973

[21] Appl. No.: 336,852

[52] U.S. Cl. .................................. 24/73 P, 85/5 R
[51] Int. Cl. ............................................ A44b 21/00
[58] Field of Search ..... 85/80, 5 R; 24/73 PF, 73 P, 24/73 PM, 73 MF, 73 D, 73 FT, 213 R, 214, 208 A

[56] References Cited
UNITED STATES PATENTS

| | | | |
|---|---|---|---|
| 1,817,775 | 8/1931 | Sipe | 85/5 R |
| 3,244,057 | 4/1966 | Mathison | 85/5 R |
| 3,303,717 | 2/1967 | Valenti | 85/80 |
| 3,309,955 | 3/1967 | Turnbull et al. | 85/5 R |
| 3,327,581 | 6/1967 | Schlueter | 85/5 R |

Primary Examiner—Bobby R. Gay
Assistant Examiner—Kenneth J. Dorner
Attorney, Agent, or Firm—Robert W. Beart; J. R. Halvorsen

[57] ABSTRACT

A one piece plastic drive fastener having a head and a shank, the shank including a generally cruciform cross section presenting a plurality of generally flat, axially extending surfaces and a plurality of angular axially extending recesses between adjacent flat surfaces which are adapted to provide tool engaging means. Each of the flat surfaces on the stud carry a plurality of axially spaced flexible resilient wing elements with the wing elements on at least one surface being axially offset from the wing elements on the other surfaces to provide a variety of grip lengths; the wings being flexed along their straight line connection with the flat surfaces thereby permitting the manufacture of such a fastener in a simple mold design.

8 Claims. 8 Drawing Figures

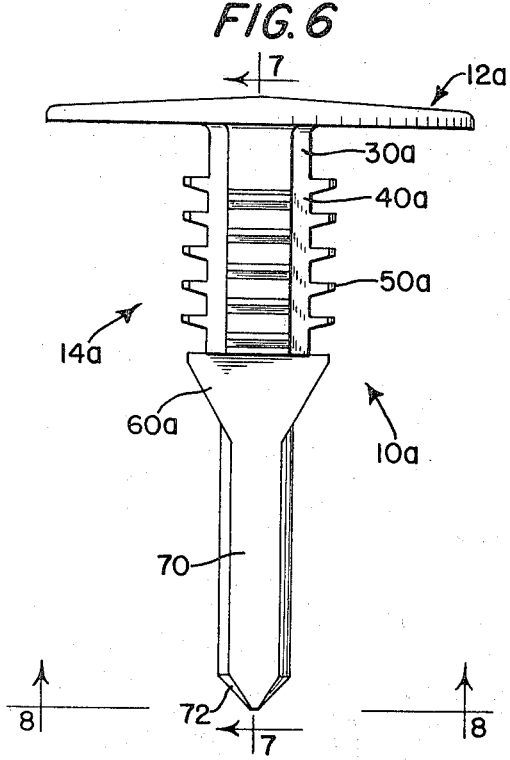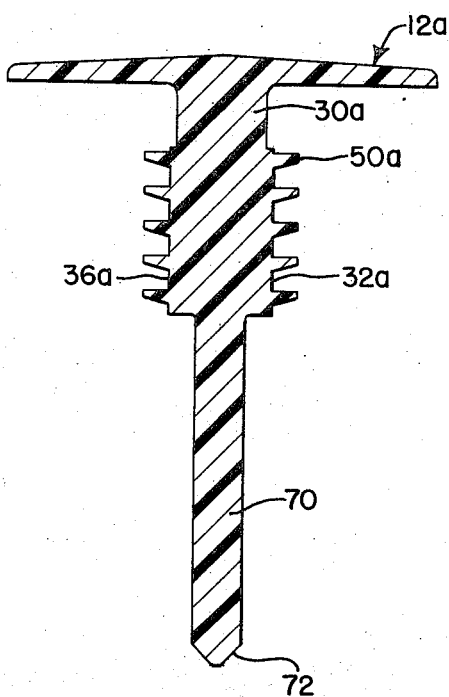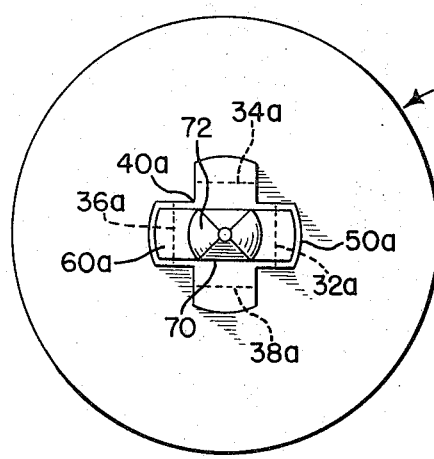

PLASTIC DRIVE FASTENER

BACKGROUND OF THE INVENTION

The state of the art at this time for plastic drive fasteners which are utilized to secure one member relative to an apertured support is highly sophisticated. There are many examples in the art of plastic studs having a plurality of circumferentially disposed rib means axially spaced along the shank of the fastener, however, in many instances, it has been found that the plastic materials, if not properly utilized, in a specific design will permit the shearing off of the retaining shoulder means from the basic stud when inserted in an apertured support of harder material. This is primarily due to the semi-rigid configuration of the annular shoulder means of the type generally shown in the U.S. Pat. to Moorman, No. 3,139,784 or the U.S. Pat. to Harris, No. 3,225,641. Various attempts have been made to overcome this problem by making the fastener shank hollow as shown in U.S. Pat. No. 2,780,128-Rapata, or No. 3,272,059-Lyday, et al. A second approach to solve the problem is the use of thin tapered fins such as shown in U.S. Pat. to Brown, No. 3,466,966 or Wayland, No. 3,494,244, these latter two forms requiring an expensive and intricate die mechanism for fabrication of the undercuts in the thin webs. This results in an increased cost for the individual fasteners and additionally, because of the design of the mold in which the fastener is made, results in a limitation in the variety or choice in grip lengths available to the user of the fastener.

SUMMARY OF THE INVENTION

It is an object of the present invention to provide a fastener design which is capable of being fabricated on simple, two-plate molds, as well as to provide a fastener in which the flexible shoulder means bends along a straight line rather than along a line of curvature, thereby reducing the stress in the material.

A further object of the invention is to provide a plurality of shoulder means which are staggered in an axial direction to thereby afford a wider variety of grip lengths to accommodate tolerances in panel thickness in the support structure.

A further object of the invention is to provide means for accommodating a gripping tool which will permit either axial or rotational forces to be applied to the fastener during installation.

Still another object of the invention is to provide a fastener which is economical to fabricate and which will overcome the deficiencies found in the prior art.

Other objects and advantages of the invention will become apparent to those skilled in the art when the specification is read in conjunction with the accompanying drawing.

BRIEF DESCRIPTION OF THE DRAWINGS

FIG. 6 is an elevational view of another embodiment of the present invention;

FIG. 7 is an elevational view in section taken along line 7—7 in FIG. 6; and

FIG. 8 is an end view taken along line 8—8 of FIG. 6.

Figure 1:
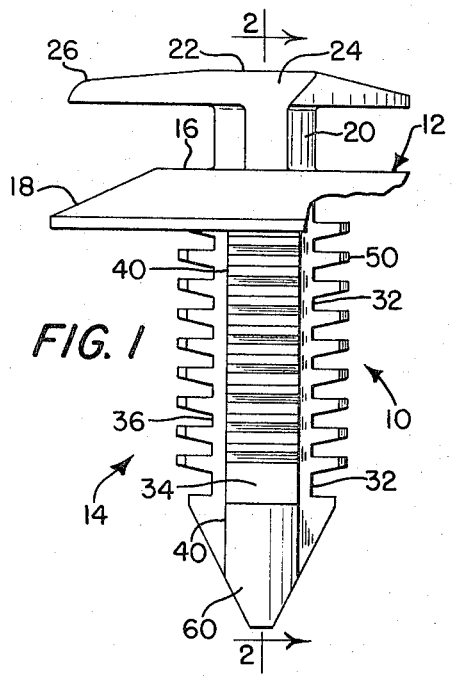
FIG. 1 is an elevational view in partial section of an embodiment of the present invention.
Figure 2:
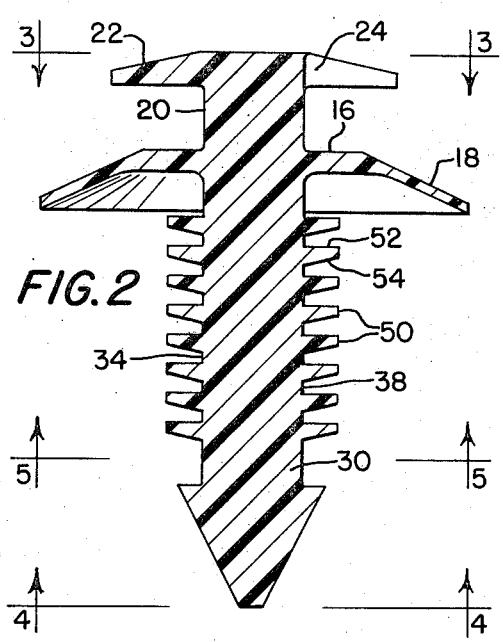
FIG. 2 is an elevational view in section taken along line 2—2 in FIG. 1.
Figure 3:
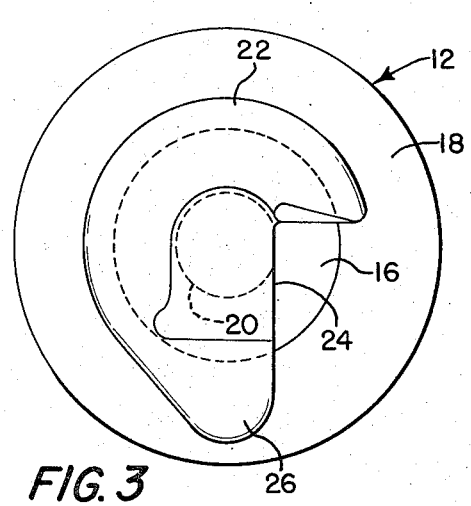
FIG. 3 is a plan view of the head end of the fastener taken along line 3—3 of FIG. 2.
Figure 4:
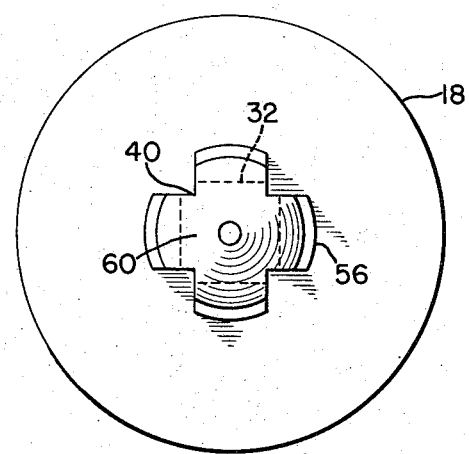
FIG. 4 is an end view taken along line 4—4 of FIG. 2.

The one-piece plastic drive fastener 10 of the type contemplated by the present invention is normally utilized to secure a trim panel, insulation material, or other secondary means in fixed relation to an apertured support. In many instances the head of the fastener may be associated with the secondary element prior to mounting on the support, however, it is also capable of being utilized in situ by axial penetration of the secondary element followed by axial telescoping with the aperture support. Such a fastener can be injection molded from suitable plastic materials, such as nylon, which exhibits the characteristics of resiliency in thin sections and rigidity in heavier sections. Referring now to the drawing, where similar parts will be designated by similar numerals, a fastener 10 will include a head 12 and a shank 14. In the embodiment shown in FIGS. 1 through 5, the head 12 is of the type generally shown and claimed in U.S. Pat. No. 3,309,955, issued in the name of A. E. Turnbull, et al., and includes a central portion 16 carrying a resilient downwardly extending flexible flange 18 which is generally capable of resiliently sealing the surface of the support panel around its aperture and also functioning as a resilient take-up means for accommodating tolerance variations Extending upwardly from the central portion 16 is an axial spacer 20, essentially a continuation of the shank 14 and a secondary head means 22. The secondary head 22 has a cutout or recessed portion 24, which eliminates a substantial portion of one quadrant of the head 22 as well as affording a lead-in tongue 26 for introduction into a circular aperture as taught by the Turnbull patent shown hereinabove. The particular configuration of the head 12 is not controlling in this invention and may take a simple circular form or provide a secondary fastening means, not shown, for accommodating trim strips, wire harnesses, or cable gripping means. Thus, any accommodating means can be utilized in the head section.

Figure 5:
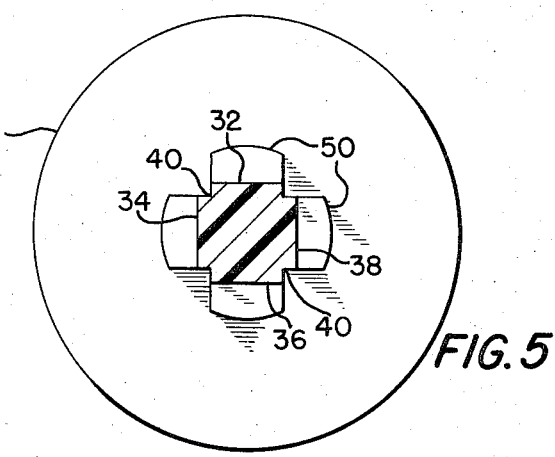
FIG. 5 is a view in partial section taken along line 5—5 of FIG. 2.

The shank 14 includes a central rigid portion 30 having a generally cruciform cross section, as best seen in FIG. 5, which presents a plurality of flat, axially extending surfaces, which in the present embodiment are shown as being four in number and with the surfaces being designated by the numerals 32 through 38. Each is separated from the adjacent surface by an axially extending groove or recess 40 for purposes best set forth hereinafter.

Integral with and extending outwardly from each of the flat surfaces 32–38 are a plurality of axially spaced wings 50 which are provided, in the present embodiment, with an upper radially extending surface 52 and a lower upwardly tapered surface 54 to provide cam lead-in into the aperture of the support. It will be noted that each of the wings 50 is joined to the cruciform cross section central portion 30 along a straight edge thereby providing a straight line hinge or bend point which facilitates ready flexing of the wings during insertion within the aperture and flexure outwardly behind the back surface of the support after passing through the aperture. Additionally, the ends 56 of the wings 50 may be curvilinear and in this embodiment fall on an imaginary cylinder coaxial with the fastener.

In this embodiment, the wings 50 which are disposed on the flat surfaces 34 and 38 are axially offset from the wings 50 falling on surfaces 32 and 36. By this means the incremental spacing of the wings 50 along the axis of the fastener is ostensively reduced to thereby provide a smaller increment of grip length available between opposed wings. It should be recognized that the incremental spacing of each of the surfaces 32 through 38 could be axially offset to varying degrees from wings on the adjacent flat surface to permit an even greater variety of grip lengths. It will be recognized that if the incremental spacing is adjusted between adjacent sides, that it is possible to approach a helical disposition for certain applications.

For those skilled in the art, it will be apparent that the fastener which has been described can be fabricated on an economical two-plate mold which will reduce the overall unit price of the fasteners fabricated. At the entering end of the shank 14 a tapered nose 60 is provided to insure ready location of the shank 14 relative to the aperture in the support. The recesses 34 are continued axially through the nose portion 60 to permit acceptance of a tool capable of gripping and/or engaging the recesses or grooves 34 to induce rotation of the fastener during insertion of the secondary head 22 into an apertures secondary panel for maintenance adjacent to the support member to be engaged by the shank 14.

Referring now to FIGS. 6 through 8, wherein similar parts are designated by similar numerals, with the addition of the suffix a, a fastener 10a is provided having a head 12 of substantial diametral extent and a shank 14a connected to the head 12a with an axially extending rigid central portion 30a having a cruciform cross section. This fastener is also provided with the flat surfaces 32a through 38a and a plurality of axially staggered and spaced wings 50a. The rigid central portion 30a adjacent the head includes the recesses or grooves 40a, a tapered generally rectangular nose portion 60a. Extending axially from the nose portion 60a is a non-circular tool gripping pilot 70 having a tapered extremity 72. The pilot portion 70 is ideally adapted to penetrate fibrous material, such as insulation, to locate the aperture in the support, and to guide the upper winged portion 30a into engagement with the support. The pilot portion 70 also serves as a means for gripping the fastener for location purposes as well as to provide a secondary axial force during insertion of the fastener and particularly in those instances where a crowded or unavailable conditions prevent application of an axial force against the head 12a to insure installation and engagement of the wings 50a with the support. It will be noted that the tapered nose 60a and the pilot 70 are so configured as to not interfere with the tool engaging recesses 40a as well as providing a simplistic design which can be economically fabricated on two-plate injection mold equipment.

It will be apparent to those skilled in the art that the instant invention contemplates a simple fastener which provides a readily flexible wing for engagement with the support as well as elimination of many of the stresses inherent in previous designs. Additionally, the fabrication of tooling to accomplish the manufacture of this invention is simplistic in design and economical in cost.

I claim:

1. A one piece plastic drive fastener including a head and a shank, said shank having a generally polygonal axially extending body portion providing a plurality of radially outwardly facing flat surfaces separated from the next adjacent surface by an angularly disposed recess, a plurality of integral resilient independent wings extending radially outwardly from each of said surfaces at axially spaced intervals, the wings on certain of said surfaces being axially offset from the wings on the other surfaces, the juncture of said wings and said surfaces being along a straight line forming a bend line for flexure of said wings during introduction of the fastener into a complimentary apertured workpiece whereby the axial staggering of said wings insures that at least one of the wings on at least one of the surfaces will be in engagement with the back side of the workpiece when the head is mounted on the front side.

2. A fastener of the type claimed in claim 1 wherein said wings each include an upper surface spaced from and facing said head which is generally normal to the axis of the fastener and the lower surface is tapered upwardly from the root of the wing toward the free end.

3. A fastener of the type claimed in claim 2 wherein the outer free edge of each wing is curvilinear and falls on an imaginary cylinder including all of the other wings.

4. A fastener of the type claimed in claim 1 wherein said fastener includes a generally rigid tapered nose portion for introduction of said fastener into the workpiece.

5. A fastener of the type claimed in claim 4 wherein the said recesses are axially continued through said nose portion to provide means for accommodating a complimentary shaped rotation inducing means.

6. A fastener of the type claimed in claim 4 wherein said nose portion includes a non-circular axial extension and said nose portion is relieved to provide axial access to said recesses.

7. A fastener of the type claimed in claim 1 wherein said head includes a resilient first portion adjacent said shank, an axially extruding spacer and secondary head means spaced from said first mentioned head, said secondary head including means for rotationally introducing said head into a panel aperture having a diametral extent substantially smaller than the average diametral extent of said secondary head, said recesses communicating axially through a nose portion carried by said shank whereby said fastener may be gripped in said recesses by a complimetary rotation inducing tool for insertion of said head into an apertured secondary panel for support by said fastener in a position adjacent to said workpiece.

8. A fastener of the type claimed in claim 1 wherein said body portion is generally cruciform in cross-section and provides four flat surfaces from which said wings extend radially the angled recesses providing a substantially right angled recess adapted for engagement by an installation tool.

* * * * *